(12) United States Patent
Watanabe et al.

(10) Patent No.: US 11,753,552 B2
(45) Date of Patent: Sep. 12, 2023

(54) CORE-SHELL PARTICLES AND USE THEREOF

(71) Applicant: NORITAKE CO., LIMITED, Nagoya (JP)

(72) Inventors: Yoshiki Watanabe, Nagoya (JP); Keiko Kato, Nagoya (JP)

(73) Assignee: NORITAKE CO., LIMITED

( * ) Notice: Subject to any disclaimer, the term of this patent is extended or adjusted under 35 U.S.C. 154(b) by 192 days.

(21) Appl. No.: 17/231,044

(22) Filed: Apr. 15, 2021

(65) Prior Publication Data

US 2021/0230436 A1 Jul. 29, 2021

Related U.S. Application Data

(62) Division of application No. 16/599,968, filed on Oct. 11, 2019, now Pat. No. 11,008,470.

(30) Foreign Application Priority Data

Mar. 28, 2019 (JP) ................. 2019-062379

(51) Int. Cl.
*C09D 5/24* (2006.01)
*C09D 7/40* (2018.01)
(Continued)

(52) U.S. Cl.
CPC ............... *C09D 5/24* (2013.01); *B01J 13/06* (2013.01); *C09D 7/62* (2018.01); *C09D 7/68* (2018.01); *C09D 7/69* (2018.01); *C09D 7/70* (2018.01)

(58) Field of Classification Search
CPC ..................................................... C09D 5/24
See application file for complete search history.

(56) References Cited

U.S. PATENT DOCUMENTS 8,110,521 B2 2/2012 Lee et al.
11,008,470 B2 5/2021 Watanabe et al.
(Continued)

FOREIGN PATENT DOCUMENTS

JP 4059904 2/1992
JP 6122905 5/1994
(Continued)

OTHER PUBLICATIONS

Brendan Farrell et al., "Alloy and Core-Shell Silver/Palladium Platelets for Ultra-Low Fire MLCCs" Center for Advanced Materials Processing; pp. 1-9. (Year: 2007), 9 pgs.

(Continued)

*Primary Examiner* — William D Young
(74) *Attorney, Agent, or Firm* — Taylor English Duma LLP (57) ABSTRACT

In a method for manufacturing core-shell particles including core particles and a shell, the constituent metal elements of the core particles and the shell are different from each other. A quinone-containing core particle dispersion containing at least core particles consisting of a first metal, hydroquinone (HQ), benzoquinone (BQ), and a second metal compound including a second metal element for making up the shell is prepared, and a reduction treatment is performed on the quinone-containing core particle dispersion, through addition of a reducing agent, to form a shell including the second metal element as a main constituent element, on the surface of the core particles. A mass ratio: HQ/BQ ratio of added hydroquinone (HQ) and benzoquinone (BQ) is 0.1 to 120.

2 Claims, 5 Drawing Sheets

(51) Int. Cl.
   *B01J 13/06*   (2006.01)
   *C09D 7/62*   (2018.01)

(56) References Cited

U.S. PATENT DOCUMENTS

| | | | |
|---|---|---|---|
| 11,219,883 | B2 | 1/2022 | Watanabe et al. |
| 2001/0004857 | A1* | 6/2001 | Sasaki ............... B22F 1/16 |
| | | | 75/741 |
| 2009/0108752 | A1* | 4/2009 | Matsuno ............. H01J 11/12 |
| | | | 428/404 |
| 2013/0313490 | A1 | 11/2013 | Eiden et al. |
| 2019/0079014 | A1 | 3/2019 | Duan et al. |
| 2019/0177613 | A1* | 6/2019 | Yu ....................... C09K 11/06 |
| 2020/0122124 | A1 | 4/2020 | Watanabe et al. |
| 2020/0308422 | A1 | 10/2020 | Watanabe et al. |

FOREIGN PATENT DOCUMENTS

| | | |
|---|---|---|
| JP | H07118868 | 5/1995 |
| JP | 8176605 | 7/1996 |
| JP | 2005105376 | 4/2005 |
| JP | 2006307330 | 11/2006 |
| JP | 2008274424 | 11/2008 |
| JP | 5535507 | 7/2014 |
| JP | 5572712 | 8/2014 |
| JP | 5946463 | 7/2016 |
| WO | 2011031118 | 3/2011 |
| WO | 2012055758 | 5/2012 |

OTHER PUBLICATIONS

Wafa I. Abdel-Fattah et al., "Synthesis of biogenic Ag@Pd Core-shell nanoparticles having anti-cancer/anti-microbial functions." Life Sciences 183, pp. 28-36. (Year: 2017), 9 pgs.
Watanabe, Yoshiki; Non-Final Office Action for U.S. Appl. No. 15/599,901, filed Oct. 11, 2019, dated Mar. 17, 2021, 18 pgs.
Kobunshi Ronbunshu; Article entitled: "Hydrogenation of 1,3-Cyclooctadiene Using Colloidal Dispersion Catalysts of Ultrafine Rhodium and Palladium Particles Protected by Poly(N-vinyl-2-pyrrolidone)", vol. 46, No. 9, p. 551-558, Sep. 1989, 8 pgs.
The 9th Annual Meeting of Japan Society for Molecular Science, Article entitled: "Hydrogen Generation through Decomposition of Formic Acid using TiO2 supported Ag@Pd Core-shell Nanocatalysts", presented on Aug. 31, 2015, 3 pgs.
Watanabe, Yoshiki; Non-Final Office Action for U.S. Appl. No. 16/599,968, filed Oct. 11, 2019, dated Sep. 30, 2020, 16 pgs.
Watanabe, Yoshiki; Notice of Allowance for U.S. Appl. No. 16/599,968, filed Oct. 11, 2019, dated Jan. 19, 2021, 7 pgs.
Watanabe, Yoshiki; Requirement for Restriction/Election for U.S. Appl. No. 16/599,968, filed Oct. 11, 2019, dated Jun. 17, 2020, 6 pgs.
Nature Nanotechnology; Article entitled: "Hydrogen Production from Formic Acid at Room Temperature over Ag Core-Pd Shell Nano-catalyst", published Apr. 10, 2011, 14 pgs.
Watanabe, Yoshiki; Notice of Allowance for U.S. Appl. No. 16/599,901, filed Oct. 11, 2019, dated Oct. 1, 2021, 12 pgs.
Noritake Co., Limited; Office Action for Japanese patent application No. 2019062379, dated Jan. 5, 2023, 16 pgs.

* cited by examiner

CORE-SHELL PARTICLES AND USE THEREOF

CROSS-REFERENCE TO RELATED APPLICATIONS

The present application is a divisional of U.S. application Ser. No. 16/599,968, filed Oct. 11, 2019, which claims priority to Japanese Patent Application No. 2019-062379, filed on Mar. 28, 2019, both of which are hereby specifically incorporated by reference herein in their entireties.

TECHNICAL FIELD

The present invention relates to metal core-shell particle comprising a core and a shell (covering portion), the main constituent metal elements of which are different from each other, and to a method for manufacturing the metal core-shell particles. Further, the present invention relates to a powder material mainly made up of such metal core-shell particles, and to a paste-like (slurry-like) material in which the powder material is dispersed in a medium.

TECHNICAL BACKGROUND

In recent years, core-shell particles have come to be used in various industrial fields, for instance from the viewpoint of imparting functionality and reducing costs. For example, AgPd core-shell particles, in which a Pd shell (covering portion) including palladium (Pd) as a main constituent metal element is formed on the surface of an Ag core including silver (Ag) as a main constituent metal element, are being developed in the field of for instance conductive pastes (also referred to as conductive pastes) and catalysts. Patent Literature 1 (Japanese Patent Application Publication No. H08-176605) discloses a method for manufacturing a palladium-coated silver powder wherein silver particles are formed through addition of a reducing agent to an aqueous solution of silver ammine chloride, followed by covering of the silver particles with palladium.

To meet the demand for smaller electronic components and thinner electrodes in recent years, for instance, powder materials for conductive pastes, being paste-like (slurry-like) compositions for forming an electrode film or the like, that have metal particles constituting the main component of the powder material, and smaller particle sizes while exhibiting a sharp particle size distribution have been demanded. Therefore, in a case where core-shell particles including constituent metal elements in the form of a noble metal such as Ag or Pd or a base metal such as Ni are used as the main component of a powder material for conductive pastes, it is important to control the particle size of the core-shell particles down to a sub-micron region, while preserving a sharp particle size distribution.

When manufacturing this kind of core-shell particles in accordance with conventional methods, however, agglomeration and/or linking (necking) sometimes occurs between the produced core-shell particles (typically primary particles), with significant formation of secondary particles for instance in the form of agglomerates and/or linked (necked) masses of large particle size. In such secondary particles, multiple primary particles are adhered to each other via respective shells, the secondary particles becoming thus strong enough so as not be amenable to crushing. The particle size of the obtained secondary particles is as a result significantly larger than the particle size of the cores of the primary particles, and exhibits significant variability in particle size. Further, the higher the shell proportion is, the more readily the particles become linked to each other via shells, which makes inter-particle adhesion yet more difficult to suppress. For instance, it is difficult to suppress linking itself by a Pd shell in the art disclosed in Patent Literature 1.

It is deemed that, in order to suppress adhesion and agglomeration, it is preferable to form the shell (covering portion) upon thorough dispersion of a powder consisting of core particles in a predetermined solution for shell formation. In a case where the core particles are dispersed using a dispersant, however, the dispersant adsorbed on the core particle surface might hinder shell formation. Meanwhile, when a shell is formed on the core particle surface a further concern arises in that the function of the dispersant adsorbed on the core particle surface may be impaired as a result, which in turn may translate into poorer dispersibility.

Non Patent Literature 1 (ZHAO Bin, Naoki TOJIMA, Japanese Journal of Polymer Science and Technology, Vol. 46 (1989) No. 9, pp. 551) describes a technology for reducing the size of metal particles contained in a powder material. Non Patent Literature 1 discloses a technology wherein metal particles (for instance of Rh or Pd) are caused to precipitate in the presence of polyvinylpyrrolidone (PVP), to thereby generate metal ultramicroparticles the surface of which is protected by PVP. Non Patent Literature 2 (Abstracts of Annual Meeting of Japan Society for Molecular Science (2015), 2P077) and Non Patent Literature 3 (Nature nanotechnology, 6, 302 (2011) Supplementary information) disclose technologies in which PVP is used for manufacturing core-shell particles. For example, in Non Patent Literature 2, for instance, a solution resulting from dissolving silver nitrate and PVP is firstly prepared, whereupon Ag is caused to precipitate from the solution, to thereby generate Ag core particles. Palladium nitrate is then dissolved in a dispersion containing the Ag core particles, after which Pd is caused to precipitate to thereby form a Pd shell on the surface of the Ag core particles. Non Patent Literature 2 indicates that the average particle size of the AgPd core-shell particles obtained in accordance with such a procedure is about 5.0 nm.

SUMMARY OF THE INVENTION

However, when the art disclosed in Non Patent Literature 2 and 3 above is actually resorted to, a problem may arise in that fine Pd single particles are likely to form in large amounts. In Non Patent Literature 2 and 3, specifically, a check of the distribution state of Ag and Pd elements by FE-SEM and EDX element mapping reveal that Pd single particles are formed in large amounts. It is very difficult to extract only the core-shell particles from such a powder material containing a large amount of Pd single particles. When the methods of Non Patent Literature 2 and 3 described above are applied to actual manufacturing process, therefore, the proportion of core-shell particles contained in the produced powder material (the yield of core-shell particles) drops significantly and, as a result, characteristics unique to the core-shell particles may fail to be sufficiently brought out, and production efficiency may decrease.

Therefore, the present invention was arrived at in view of the above conventional problem in the production of metal core-shell particles (hereafter also referred to simply as "core-shell particles") such as those described above including a core and a shell of mutually different main constituent metal elements. It is a main object of the present invention to provide an art that allows obtaining efficiently core-shell particles the particle size whereof is controlled to a submicron region, by properly suppressing formation of secondary particles derived from inter-particle adhesion, but without reducing the yield of the core-shell particles. It is a further object of the present invention to provide a powder material mainly made up of such core-shell particles, and a paste-like (slurry-like) material in which the powder material is dispersed in a predetermined dispersion medium.

In order to attain the above goal, the present invention provides metal core-shell particles, comprising core particles and a shell covering at least part of the core particles, the main constituent metal elements of the core particles and the shell being different from each other, and provides a powder material substantially comprising the core-shell particles.

Upon measurement of the powder material disclosed herein in a state of being dispersed in a predetermined medium (typically water, dimethylformamide (DMF), ethylene glycol (EG), isobornyl acetate (IBA) or the like; likewise hereafter), a ratio $D_{DLS}/D_{SEM}$ of a Z average particle size ($D_{DLS}$) based on a dynamic light scattering (DLS) method and an average particle size ($D_{SEM}$) based on a field-emission scanning electron micrograph (FE-SEM image) is 2 or lower.

Herein, the term "substantially comprising" signifies that the abundance ratio of the metal core-shell particles is significant, and typically signifies that 80 number % or more, yet more preferably 90 number % or more (further 95 number % or more) of all the particles that make up the powder material are metal core-shell particles.

It is considered that such a $D_{DLS}/D_{SEM}$ is a suitable index for representing the degree of adhesion between core-shell particles (meaning herein assembly) contained in the powder material, i.e. a suitable index of dispersibility. A powder material having such $D_{DLS}/D_{SEM}$ (hereafter also referred to as "degree of adhesion") of 2 or lower exhibits good dispersibility, and accordingly can be suitably used in particular in applications that involve forming a conductor, for instance fine electrodes, or can be used as a starting material of a noble metal catalyst. The above $D_{DLS}/D_{SEM}$ is more preferably 1.6 or lower, and particularly preferably 1.2 or lower.

Both hydroquinone (HQ) and benzoquinone (BQ) are deposited on the surface of the core-shell particles, in the powder material in a preferred implementation disclosed herein.

Through formation of the shell on the surface of the core particles in a state where hydroquinone and benzoquinone are co-present, as in the production method described below, it becomes possible to provide a powder material (assembly of core-shell particle) of good dispersibility, in which the above degree of adhesion is 2 or lower.

Preferably, a mass ratio: HQ/BQ ratio of the hydroquinone (HQ) and benzoquinone (BQ) deposited on the surface of the core-shell particles is 0.1 to 120. Particularly good dispersibility can be brought out by a powder material consisting core-shell particles including hydroquinone (HQ) and benzoquinone (BQ) at a proportion lying in the above range. Such a HQ/BQ ratio lies more preferably 1 to 100, and particularly preferably 20 to 90.

In a particularly preferred implementation of the powder material, upon measurement of the powder material in a state of being dispersed in a predetermined medium, the Z average particle size ($D_{DLS}$) based on a dynamic light scattering method is 0.1 μm to 2 μm, and a polydispersity index (PDI) based on a dynamic light scattering method is 0.3 or lower.

In the powder material disclosed herein agglomeration and necking are suppressed, and agglomerates/or linked (necked) masses of large particle size do not form readily, even in assembly of core-shell particles having a small particle size and a particle size distribution controlled to be narrow. Accordingly, the powder material disclosed herein can be suitably used in particular in applications for conductor formation, for instance formation of fine electrodes, or can be used as a starting material of noble metal catalysts.

Herein, $D_{DLS}$ is more preferably 0.1 μm to 1 μm, and particularly preferably 0.2 μm to 0.8 μm. Further, PDI is more preferably 0.25 or lower, and particularly preferably 0.2 or lower.

In a preferred implementation, the core particles are made up of silver (Ag) as a main constituent metal element, and the shell is made up of at least one metal belonging to the platinum group (ruthenium (Ru), rhodium (Rh), palladium (Pd), osmium (Os), iridium (Ir) or platinum (Pt)), or nickel (Ni), as a main constituent metal element. The art disclosed herein allows providing a high-dispersibility powder material made up of core-shell particles including an Ag core and a shell being mainly a platinum group metal element (for instance platinum and/or palladium) or nickel.

For instance a high-dispersibility powder material can be provided such that the mass proportion of the shell is 0.5 to 45 mass % with respect to 100 mass % as the mass of the totality of the core-shell particles contained in the powder material.

The powder material disclosed herein can be suitably used in various industrial fields. A particularly suitable application among the foregoing is formation of electrodes (conductors) in electronic components of steadily shrinking size in recent years. Therefore, the present invention allows providing also a conductive paste (paste-like composition) provided with any one of the powder materials disclosed herein, and a medium in which the powder material is dispersed.

In order to attain the above goal, the present invention further provides a method for suitably manufacturing the powder material disclosed herein. The manufacturing method disclosed herein is a method for manufacturing metal core-shell particles comprising core particles and a shell covering at least part of the core particles, the main constituent metal elements of the core particles and the shells being different from each other, the method comprising:

a step of preparing a quinone-containing core particle dispersion containing at least core particles consisting of a first metal, hydroquinone (HQ), benzoquinone (BQ), and a second metal compound including a second metal element for making up the shell; and a step of forming a shell including the second metal element as a main constituent element on the surface of the core particles by adding a reducing agent to perform a reduction treatment on the quinone-containing core particle dispersion.

The inventors found that the shell can be formed and can precipitate selectively, on the surface of the core particles, by coexisting hydroquinone ($C_6H_4(OH)_2$) and benzoquinone ($C_6H_4O_2$; may be either of o-benzoquinone and p-benzoquinone, without distinction between the two structural isomers) at a time of formation of the shell on the surface of the core particles. As a result, it becomes possible to form desired core-shell particles with a high yield, and to suppress adhesion and agglomeration of core-shell particles with one another, which in turn allows suitably manufacturing a powder material substantially comprising core-shell particles of high dispersibility and small particle size.

Preferably, a HQ/BQ ratio which is the mass ratio of the added hydroquinone (HQ) and benzoquinone (BQ) is about 0.1 to 120.

The powder material disclosed herein can be produced yet more suitably by setting the above HQ/BQ ratio.

In a preferred implementation, the core particles are made up of silver (Ag) as a main constituent metal element, and the shell is made up of at least one metal belonging to the platinum group, or nickel (Ni), as a main constituent metal element.

A manufacturing method having the above features allows providing a high-dispersibility powder material comprising core-shell particles comprising an Ag core and a shell being mainly a platinum group metal element (for instance Pt or Pd), or nickel.

DESCRIPTION OF THE RELATED EMBODIMENTS

Preferred embodiments of the present invention will be explained below. Any features other than the matter specifically set forth in the present specification and that may be necessary for carrying out the present invention can be regarded as design matter for a person skilled in the art based on conventional techniques in the relevant technical field. The present invention can be realized on the basis of the disclosure of the present specification and common technical knowledge in the relevant technical field.

In the present description and the claims, a numerical value range notated as "A to B" (where A and B are arbitrary numerical values) denotes a value equal to or larger than A and equal to or smaller than B. Therefore, this includes instances where a value exceeds A and is below B.

The powder material disclosed herein comprises metal core-shell particles comprising core particles and a shell converting at least part of the core particles, the main constituent metal elements of the core particles and the shells being different from each other, and is a powder material substantially comprising the core-shell particles, wherein upon measurement of the powder material in a state of being dispersed in a predetermined medium, a ratio $D_{DLS}/D_{SEM}$ of a Z average particle size ($D_{DLS}$) based on a dynamic light scattering (DLS) method and an average particle size ($D_{SEM}$) based on a field-emission scanning electron micrograph (FE-SEM image) is 2 or lower.

Core-shell particle assembly (powder material) exhibiting such a characteristic can be suitably produced in accordance with the manufacturing method disclosed herein. Preferred embodiments of such a manufacturing method will be explained below.

In the manufacturing method disclosed herein, a quinone-containing core particle dispersion that contains at least core particles consisting of a predetermined metal, hydroquinone, benzoquinone, and a metal compound for constituting the shell is prepared. Then, a reduction treatment is performed by adding a predetermined reducing agent to the above dispersion. In the present method, a shell becomes formed as a result on the surface of the core particles, the shell mainly including a metal element different from those of the core particles.

The dispersion of core particles being the main constituent of the quinone-containing core particle dispersion is not particularly limited, and may be prepared in accordance with various methods. For instance, a dispersion of core particles resulting from dispersing commercially available metal particles (powder material) in an aqueous solvent may be used herein.

Alternatively, core particles consisting of a predetermined metal may be generated in a predetermined solution, to thereby prepare a core particle dispersion. As a process for preparing core particles consisting of a predetermined metal such as Ag, in a preferred embodiment, for instance a solution for core particle generation obtained by dissolving a compound containing the above metal element is prepared, and the solution is subjected next to a reduction treatment, as a result of which core particles consisting of the metal can be generated in the solution. The compound used herein may allow generating core particles as a result of a reduction treatment in the solution that is utilized. A salt or complex of the metal (for instance Ag) can be used preferably herein. Examples of the salt include halides such as chlorides, bromides and iodides, as well as hydroxides, sulfides, sulfates and nitrates. Examples of complexes include ammine complexes, cyano complexes, halogeno complexes and a hydroxy complexes.

The solvent for dissolving compounds such as those above may be an aqueous solvent or an organic solvent. Water or a mixed solution including water as a main constituent (for instance a mixed solution of water and a lower alcohol such as ethanol) can be used as the aqueous solvent. Alcohols such as methanol and ethanol, ketones such as acetone and methyl ketone, and esters such as ethyl acetate, can be used as the organic solvent.

The content of the metal compound in the solution for core particle generation can vary depending on the intended purpose, and is not particularly limited. As an example, in a case where the solvent is water or another aqueous solvent (for example a mixed solvent of water and ethanol), a solution that is used is preferably prepared so that the molar concentration of the metal compound is about 0.1 M to 3 M. Various additives can be added, besides the metal compound and the solvent, to prepare such a solution. Examples of additives include complexing agents. For instance, aqueous ammonia or potassium cyanide can be used as the complexing agent. By adding an appropriate amount of the complexing agent it becomes possible to form easily, in solution, a complex including a desired metal element as the central metal ion. In consequence, the target metal core particles can be easily generated as a result of a subsequent reduction treatment. The solution for core particle generation may be prepared through stirring while temperature conditions are kept in a given range. The temperature conditions herein may be set to about 20° C. to 60° C. (more preferably 30° C. to 50° C.). The stirring rotational speed may be about 100 rpm to 1000 rpm (more preferably 300 rpm to 800 rpm, for instance 500 rpm).

The target metal core particles are generated as a result of a reduction treatment through addition of an appropriate reducing agent to the solution for core particle generation thus prepared. Preferred examples of the reducing agent include hydroquinone. The solution is preferably prepared so as to contain also polyvinylpyrrolidone (PVP), in addition to hydroquinone. The core particles can be generated more efficiently by incorporating also PVP, in addition to hydroquinone. A reducing agent other than hydroquinone or PVP may also be co-present. For instance, also a hydrazine compound such as hydrazine carbonate, hydrazine, hydrazine monohydrate or phenylhydrazine is preferably used concomitantly. The addition amount of the reducing agent may be set properly in accordance with the state of the reaction system, and accordingly is not particularly limited. The particle size of the metal core particles (and accordingly the particle size of the core-shell particles) can be controlled through appropriate adjustment of the concentration of the reducing agent. Ordinarily, the particle size of the core particles (and accordingly the particle size of the core-shell particles) can be smaller by increasing the concentration of the reducing agent. In the reduction treatment, preferably, pH is adjusted to be 8 or higher, for instance to be about 9 to 11, through addition of a pH adjusting agent to the solution for core particle generation. For instance, a basic substance such as sodium hydroxide (NaOH) or aqueous ammonia can be used as the pH adjusting agent. The reduction treatment time can be set as appropriate. Although not particularly limited thereto, the reduction treatment time may preferably be about 0.5 hours to 3 hours.

The core particles generated as a result of a reduction treatment described above may be collected with a conventional method, and is not particularly limited. Preferably, the core particles generated in solution are allowed to settle, or are centrifuged, to thereby remove a supernatant. Preferably the core particles may be washed several times and then dispersed in an appropriate dispersion medium to be collected as desired metal core particles in a dispersion.

In the manufacturing method disclosed herein, a quinone-containing core particle dispersion containing at least the metal core particles, hydroquinone, benzoquinone and a metal compound containing a main constituent metal element different from that of the core for shell forming is next prepared.

As a preferred embodiment, for instance, a quinone-containing core particle dispersion can be prepared by adding a predetermined amount of hydroquinone and benzoquinone, and further by adding a starting material compound for shell formation containing a metal element (for instance Ni or a noble metal element belonging to the platinum group, such as Pd) to a core particle dispersion obtained through dispersion of core particles consisting of a predetermined metal such as Ag in an aqueous solvent. Since such a quinone-containing core particle dispersion is a dispersion of core particles, in order to homogenize the dispersion, to perform a dispersion treatment, for instance an ultrasonic treatment, during preparation of the quinone-containing core particle dispersion may be preferable. The solvent (dispersion medium), additives, preparation process and so forth involved in the preparation of the quinone-containing core particle dispersion may be substantially identical to those used in the preparation of the solution for core particle generation described above, and a recurrent explanation thereof will be omitted herein.

The contents (content ratios) of the various components that make up the quinone-containing core particle dispersion may be adjusted as appropriate, and are not particularly limited, so long as the contents are suitable for generating the target core-shell particles. In a case for instance where the core particle content in the quinone-containing core particle dispersion is about 20 g/L to 50 g/L, the content of hydroquinone is preferably about 0.1 g/L to 5 g/L (more preferably 0.2 g/L to 3 g/L), and the content of benzoquinone is preferably about 0.001 g/L to 3 g/L (more preferably 0.002 g/L to 1.5 g/L). In a case where the core particle content in the quinone-containing core particle dispersion is about 20 g/L to 50 g/L, the total amount of the above two types of quinone is appropriately about 0.2 g/L to 4 g/L.

Preferably, a HQ/BQ ratio which is the mass ratio of added hydroquinone (HQ) and added benzoquinone (BQ) is about 0.1 to 120. A powder material of core-shell particles having particularly good dispersibility can be produced when the HQ/BQ ratio lies in such a range.

As long as the compound form a shell on the surface of the core particles by performing a reduction treatment in the quinone-containing core particle dispersion which is used, a starting material compound for shell formation, mainly including a platinum group metal element such as Pd, a noble metal element such as gold (Au), or a base metal element such as Ni may be used. A salt or complex of the metal (for instance Pt or Pd, or a base metal such as Ni) can be preferably used herein. Examples of the salt include halides such as chlorides, bromides and iodides, as well as hydroxides, sulfides, sulfates and nitrates. Examples of complexes include ammine complexes, cyano complexes, halogeno complexes and hydroxy complexes.

The content of the starting material compound for shell formation included in the quinone-containing core particle dispersion can vary depending on the intended purpose, and accordingly is not particularly limited. For instance, core-shell particles provided with a shell that affords sufficiently high coverage can be obtained, while the use amount of the second metal compound can be small, if a mass ratio (core/shell proportion) of the first metal that the core particles and the second metal making up the shell, contained in the quinone-containing core particle dispersion, is about 60/40 to 95/5.

The quinone-containing core particle dispersion thus prepared contains hydroquinone acting as a reducing agent, but it is preferable to further add another reducing agent, to perform an effective reduction treatment in a short time. Preferably, also a hydrazine compound such as hydrazine carbonate, hydrazine, hydrazine monohydrate or phenylhydrazine may be used concomitantly, as such a reducing agent. Alternatively, also an organic acid such as tartaric acid, citric acid or ascorbic acid, and a salt thereof (tartrate, citrate, ascorbate and so forth), and sodium borohydride, may be used concomitantly herein.

The addition amount of such reducing agents that are used concomitantly may be properly set in accordance with the state of the reaction system, and therefore is not particularly limited. Preferably, the pH can be adjusted to 8 or more, for instance to about 9 to 11, through addition of a pH adjusting agent to the quinone-containing core particle dispersion during the reduction treatment. As the pH adjusting agent, for instance a basic substance such as sodium hydroxide (NaOH) or aqueous ammonia can be used. The reduction treatment time can be set as appropriate. Although not particularly limited thereto, the reduction treatment time is preferably for instance in the range of about 5 minutes to 2 hours.

The core-shell particles generated as a result of the reduction treatment may be collected, without particular limitations, in the same way as the metal core particles described above are collected from the solution after the reduction treatment. Preferably, the core-shell particles generated in the solution are allowed to settle, or alternately be centrifuged, to remove the supernatant. Yet more preferably, the particles can be collected in the form of a powder material by, after a plurality of washing operations with pure water or an alcohol, being for instance dried and crushed as appropriate.

A dispersion of desired core-shell particles can be prepared thus through dispersion of the collected core-shell particles (a powder material) in an appropriate dispersion medium.

Further, a paste (slurry)-like solid composition (for instance a conductive paste for forming an electrode film or the like) can be prepared through further addition of a component such as a binder.

As pointed out above, in the manufacturing method disclosed herein a shell is precipitated on the surface of core particles, in a reaction system including hydroquinone and benzoquinone mixed thereinto. As a result, shell precipitation can be adjusted based on the interactions between the shell-constituting metal and hydroquinone and benzoquinone, in the shell precipitation process. Therefore, the metal or metal compound derived from the starting material compound for shell formation can efficiently precipitate on the surface of the core particles, without forming by itself single particles, and can suppress adhesion and agglomeration between core-shell particles.

The powder material disclosed herein, i.e. powder of metal core-shell particles, can be suitably produced as a result of the above steps. There can be provided moreover a powder material substantially comprising such AgPd core-shell particles. For instance, a powder material consisting of core-shell particles (for instance, AgPd core-shell particles) consisting of Ag core particles that have Ag as a main constituent metal element can be provided, and a shell including, as a main constituent metal element, a platinum group metal such as Pd, and which covers at least part of the surface of the Ag core particles, and wherein both hydroquinone and benzoquinone are deposited on the surface of the core-shell particles.

The mass proportion of the shell with respect to 100 mass % as the mass of the totality of the core-shell particles contained in the powder material is preferably 0.5 to 45 mass %. A powder material having such a proportion can bring out high dispersibility. The mass proportion is yet more preferably 1 to 40 mass %, and particularly preferably 3 to 30 mass %.

It suffices herein that the core particles have a predetermined first metal (for instance a noble metal such as Ag) as a main constituent metal element, but this does not rule out the presence of another constituent element (constituent chemical element) other than the first metal. For instance, the substance amount of the first metal (for instance Ag) may be 90 mol % to 100 mol %, and is preferably 95 mol % to 100 mol %, with respect to 100 mol % as the substance amount of all the metal elements contained in the core particles. In a case for instance where the first metal element is Ag, examples of other metal elements that the core particles can contain include nickel (Ni), copper (Cu), aluminum (Al), palladium (Pd), iron (Fe), cobalt (Co), gold (Au), platinum (Pt), ruthenium (Ru), iridium (Ir), indium (In), zinc (Zn), tin (Sn), bismuth (Bi) and antimony (Sb). Suitable metals among the foregoing are platinum group elements such as Pd and Pt, and also Ni. Besides the metal component, the core particles may contain small amounts of components such as oxides, sulfides, phosphides and borides.

Although not particularly limited thereto, the shape of the core particles is preferably substantially spherical, and the average particle size of the core particles is appropriately for instance about 100 nm to 2000 nm, more preferably about 100 nm to 1000 nm. The average particle size can be measured in accordance with various methods.

Suitable typical examples include a Z average particle size ($D_{DLS}$) based on a dynamic light scattering method (for instance a cumulant method), and an average particle size ($D_{SEM}$) based on a measured image (FE-SEM image) by a scanning electron microscope (SEM), for instance a field-emission scanning electron microscope.

The shell (covering portion) of the core-shell particles making up the powder material disclosed herein is a coating film portion including, as a main constituent metal element, a metal (second metal element) other than the main constituent metal element of the core particles (first metal element).

Similarly to the core particles described above, the shell may contain various metal elements and/or non-metal elements other than the second metal element (main constituent metal element). Although not particularly limited thereto, the substance amount of the second metal element (main constituent metal element) may be 30 mol % to 100 mol %, preferably 50 mol % to 100 mol %, with respect to 100 mol % as the substance amount of all the elements contained in the shell. In a case for instance where the second metal element is Pd, examples of other elements that the shell can contain include Ni, Cu, Al, Fe, Co, Au, Pt, Ru, Ir, In, Zn, Sn, Bi, Sb, P, B, O, N and H. In a case alternatively where the second metal element is Ni, examples of other elements that the shell can contain include Cu, Al, Fe, Co, Au, Pd, Pt, Ru, Ir, In, Zn, Sn, Bi, Sb, P, B, O, N and H.

In a case where the core particles are Ag particles and the second noble metal element that makes up the shell is a platinum group element such as Pd, the other element is appropriately a platinum group element other than Pd, for instance Pt, in terms of enhancing the chemical and thermal stability of the core-shell particle surface, and in terms of affinity with the Ag core particles. Similarly to the core particle portion, the shell may contain a compound such as an oxide or sulfide. For instance, the shell may be in the state of a compound such as an oxide, phosphide, boride or nitride containing an element other than the main constituent metal element, such as those described above.

Although not meant to limit particularly the present invention, the thickness of the shell may be for instance 0.2 nm to 100 nm.

The powder material disclosed herein exhibits particularly superior dispersibility such that a ratio $D_{DLS}/D_{SEM}$ of a Z average particle size ($D_{DLS}$) based on a dynamic light scattering (DLS) method and an average particle size ($D_{SEM}$) based on a field-emission scanning electron micrograph (FE-SEM image), in a state where the powder material is dispersed in a predetermined medium, is 2 or lower. The powder material disclosed herein can contribute as a result to reducing the size of electronic components and reducing the thickness of electrodes, in the field or electronic materials.

Further developments can be suitably achieved, for instance in terms of reducing electrode thickness and improving reliability, through the use of a powder material substantially comprising metal core-shell particles having a Z average particle size ($D_{DLS}$), based on a dynamic light scattering method, of 0.1 μm to 2 μm, and a comparatively small average particle size such that the polydispersity index (PDI) of the particles based on a dynamic light scattering method is 0.3 or lower, and such that the particle size distribution of the particles is controlled to be narrow.

A paste-like composition (conductive paste) for various applications can be provided by dispersing the powder material disclosed herein in a dispersion medium such as an aqueous solvent or an organic solvent. Such a conductive paste contains metal core-shell particles the particle size whereof is controlled to lie in a sub-micron region, and accordingly the paste can suitably form sufficiently thinned electrodes.

The dispersion medium of the conductive paste may be any dispersion media used in conventional conductive paste preparations, without particular limitations, so long as the dispersion medium allows dispersing satisfactorily a conductive powder material, similarly to conventional dispersion media. Examples of organic solvents that can be used include, singly or as a combination of a plurality of types, high-boiling point organic solvents such as petroleum hydrocarbons (in particular aliphatic hydrocarbons), for instance mineral spirits; cellulose polymers such as ethyl cellulose; ethylene glycol and diethylene glycol derivatives; as well as toluene, xylene, butyl carbitol (BC) and terpineol.

Besides the metal core-shell particles, the conductive paste may contain additives such as a dispersant, a resin material (for example an acrylic resin, an epoxy resin, a phenolic resin, an alkyd resin, a cellulose polymer, polyvinyl alcohol or a rosin resin), a vehicle, a filler, glass frit, a surfactant, a defoaming agent, a plasticizer (for instance a phthalate ester such as dioctyl phthalate (DOP)), a thickener, an antioxidant, a dispersant and/or a polymerization inhibitor.

As examples of the powder material disclosed herein, several instances will be explained below pertaining to the production of powder materials consisting of AgPd core-shell particles, AgPt core-shell particles or AgNi core-shell particles in which a shell including Pd, Pt or Ni as a main constituent is formed on the surface of Ag core particles. However, such test examples are not meant to limit the present invention in any way.

1. PRODUCTION OF POWDER MATERIALS (EXAMPLES AND COMPARATIVE EXAMPLES)

Example 1-1

Preparation of Ag Core Particle Dispersion (Ag Slurry)

Herein, 14.23 g of silver nitrate ($AgNO_3$: by Ohura Precious Metal Industry Co., Ltd.) were dissolved, through stirring, in 136.5 mL of pure water, using a magnetic stirrer. Then, 12.5 mL of 28% aqueous ammonia (product of Wako Pure Chemical Industries, Ltd.) were added to the solution, and the whole was stirred using a magnetic stirrer, to prepare an Ag ammine complex ($[Ag(NH_3)_2]^+$) solution being a silver compound that constitutes a starting material. The solution herein was colorless and transparent.

Separately from this solution, 4.61 g of hydroquinone (product of Tokyo Chemical Industry Co., Ltd.) and 2.73 g of polyvinylpyrrolidone (PVP) K30 (product of Wako Pure Chemical Industries, Ltd.) were dissolved in 136.5 mL of alcohol (industrial alcohol, product of Amakasu Chemical Industries) while under stirring using a magnetic stirrer. Thereafter, 0.164 mL of hydrazine monohydrate (product of Wako Pure Chemical Industries, Ltd.) were added under stirring, to prepare a reducing agent (solution).

The reducing agent (solution) was then added all at once, while under vigorous stirring using a magnetic stirrer, and stirring was further continued for 1 minute. At this time, Ag core particles precipitated (were generated) instantly on account of the reducing action, whereupon the solution changed from a gray color to a dark brown color. Thereafter, the Ag core particles generated by being allowed to stand for about 1 hour were then allowed to settle, and the supernatant was removed, after which the Ag core particles were dispersed in 40 mL of a mixed aqueous solvent of alcohol:pure water=1:1 (volume ratio), and were centrifuged (6000 rpm; 10 minutes). Thereafter, washing for removing the supernatant was repeated twice, and similar washing was further carried out once, but changing herein the solvent to 40 mL of pure water. The Ag core particle dispersion (Ag slurry) of the present example was thus prepared.

Formation of Core-Shell Particles and Production of Powder Material

Then, 244 mL of pure water were added to the Ag slurry, in an amount corresponding to 9.0 g of Ag core particles, and 60 mL of an aqueous solution (hereafter referred to as "quinone solution") containing hydroquinone and benzoquinone were further added, with stirring using a magnetic stirrer. A measurement by gas chromatography (GC) of the added quinone solution at this time revealed a hydroquinone concentration of 2.45 g/L, a benzoquinone concentration of 0.15 g/L and a HQ/BQ ratio of 16.

Next, 24.98 mL of a solution (prepared so as to contain 1 g of Pd) resulting from dissolving diamminedichloropalladium (II) in 2.0% aqueous ammonia were added, with stirring using a magnetic stirrer and with ultrasonic dispersion for 10 minutes. Then, 2.55 mL of the reducing agent hydrazine carbonate (product of Otsuka Chemical Co., Ltd.) were added while under stirring of the slurry using a magnetic stirrer, and stirring was continued for 30 minutes. Herein, blackening and foaming of the slurry exhibiting Pd precipitation, derived from reduction of a Pd complex, were observed about 5 to 10 after addition of the hydrazine carbonate. An analysis of the supernatant by X-ray fluorescence (XRF) revealed that all the Pd complex had been reduced and had precipitated.

The dispersion (slurry) of AgPd core-shell particles thus obtained was allowed to settle for more than 1 hour, the supernatant was removed, after which a washing step was carried out that involved dispersing in 40 mL of pure water and centrifugation (6000 rpm; 5 minutes). Thereafter, similar washing was carried out but changing pure water to 40 mL of ethanol. This was followed by vacuum drying at room temperature, and subsequent crushing in a mortar, to produce a powder material consisting of the AgPd core-shell particles of Example 1-1.

A surface component was extracted through addition of ethanol to the dry powder material, with stirring, and was concentrated until HQ and BQ were detected by GC measurement. Herein, a GC measurement of the surface component yielded a HQ/BQ ratio of 15. This result revealed that there was virtually no change in the HQ/BQ ratio in the added quinone solution and the HQ/BQ ratio in the core-shell particle surface; accordingly, it was deemed that there was no change in the HQ/BQ ratio in the quinone solution and in the core-shell particles, in other examples.

Example 1-2

A powder material consisting of AgPd core-shell particles of Example 1-2 was produced using the same materials and in accordance with the same process as in Example 1-1 above, but herein the addition amount of the quinone solution was set to 30 mL, with a hydroquinone concentration of 3.21 g/L and a benzoquinone concentration of 0.05 g/L.

Example 1-3

An Ag core particle dispersion (Ag slurry) was prepared using the same materials and in accordance with the same process as in Example 1-1, but herein with 1.42 g of $AgNO_3$, 13.7 mL of pure water, 1.3 mL of 28% aqueous ammonia, 0.46 g of hydroquinone, 0.07 g of PVP, and 13.7 mL of alcohol, without added hydrazine monohydrate, and with the washing solvent amount modified to 30 mL.

Next a powder material consisting of AgPd core-shell particles of Example 1-3 was produced using the same materials and in accordance with the same process as in Example 1-1, but herein using an Ag slurry, in an amount corresponding to 0.9 g of Ag core particles, 24.4 mL of pure water, 3.0 mL of quinone solution, 2.5 mL of a solution resulting from dissolving diamminedichloropalladium (II) in 1.0% aqueous ammonia (prepared so as to contain 0.1 g of Pd), and 0.255 mL of hydrazine carbonate.

Example 1-4

An Ag core particle dispersion (Ag slurry) was prepared using the same materials and in accordance with the same process as in Example 1-1, but herein using 46.90 g of $AgNO_3$, 450 mL of pure water, 37 mL of 28% aqueous ammonia, 15.2 g of hydroquinone, 9.0 g of PVP, 450 mL of alcohol, and 0.108 mL of hydrazine monohydrate, and by dividing the Ag slurry into three for washing.

Next, a powder material consisting of AgPd core-shell particles of Example 1-4 was produced using the same materials and in accordance with the same process as in Example 1-3, but herein with a hydroquinone concentration of 29.90 g/L and a benzoquinone concentration of 0.26 g/L in the quinone solution that was utilized.

Example 1-5

Next, a powder material consisting of AgPd core-shell particles of Example 1-5 was produced using the same materials and in accordance with the same process as in Example 1-4, but herein with a hydroquinone concentration of 4.65 g/L and a benzoquinone concentration of 13.72 g/L in the quinone solution that was utilized.

Example 2-1

Preparation of Ag Core Particle Dispersion (Ag Slurry)

Herein, 19.24 g of $AgNO_3$ were dissolved in 150 mL of pure water, with stirring using a magnetic stirrer. Then, 16.0 mL of 28% aqueous ammonia were added to the solution, with stirring using a magnetic stirrer, to prepare an Ag ammine complex solution. The solution herein was colorless and transparent.

The solution was then diluted to volume with pure water in a 200 mL volumetric flask, to thereby prepare 61.1 g/L of an Ag ammine complex solution.

Separately from this solution, 6.75 g of hydroquinone and 4.0 g of PVP (K30 above) were dissolved in 150 mL of alcohol while under stirring using a magnetic stirrer. Thereafter, 0.240 mL of hydrazine monohydrate were added, with stirring, and the whole was diluted to volume, with alcohol, in a 200 mL volumetric flask, to prepare a reducing agent (solution).

Then, 49.1 mL of the Ag ammine complex solution were transferred to a 200-mL beaker, and 45.3 mL of the reducing agent (solution) held in another beaker were added all at once, while under vigorous stirring using a magnetic stirrer, and with further continuous stirring for 1 minute. Thereupon, Ag core particles precipitated (were generated) instantly on account of the reducing action, with the solution changing from a gray color to a dark brown color. Thereafter, the Ag core particles generated by being left to stand for about 1 hour were then allowed to settle, and the supernatant was removed, after which the Ag core particles were dispersed in 40 mL of a mixed aqueous solvent of alcohol:pure water=1:1 (volume ratio), and were centrifuged (6000 rpm; 10 minutes). Thereafter, washing for removing the supernatant was repeated twice, and similar washing was further carried out once, but changing herein the solvent to 40 mL of pure water. The Ag core particle dispersion (Ag slurry) of the present example was thus prepared.

Formation of Core-Shell Particles and Production of Powder Material

First, 65 mL of pure water were added to an amount of the Ag slurry corresponding to 3.0 g of Ag core particles, and then 20 mL of an aqueous solution (in the present example, the solvent was modified to alcohol:pure water=1:1 (volume ratio)) containing hydroquinone and benzoquinone were further added, with stirring using a magnetic stirrer. Herein, the added quinone solution had a hydroquinone concentration of 2.90 g/L and a benzoquinone concentration of 1.79 g/L.

Next, 16.7 mL of a solution resulting from dissolving diamminedichloropalladium (II) in 1.0% aqueous ammonia (prepared so as to contain 0.33 g of Pd) were added, with stirring using a magnetic stirrer and with ultrasonic dispersion for 10 minutes. Then, 0.85 mL of the reducing agent hydrazine carbonate were added while under stirring of the slurry using a magnetic stirrer, and stirring was continued for 30 minutes.

The dispersion (slurry) of AgPd core-shell particles thus obtained was allowed to settle for more than 1 hour, and the supernatant was removed, after which washing steps were carried out twice for supernatant removal that involved dispersing in 40 mL of a mixed solvent of pure water and ethanol at a volume ratio of 1:1, and centrifugation (6000 rpm; 5 minutes). Thereafter, similar washing was carried out once, by modifying the solvent to 40 mL of pure water. In order to replace water included in the AgPd core-shell particles with acetone, a step was then carried out twice of adding 40 mL of acetone, with stirring, and with centrifugation (6000 rpm; 10 minutes). This was followed by vacuum drying at room temperature, and subsequent crushing in a mortar, to produce a powder material consisting of the AgPd core-shell particles of Example 2-1.

Example 2-2

A powder material consisting of AgPd core-shell particles of Example 2-2 was produced using the same materials and in accordance with the same process as in Example 2-1, but herein to form the AgPd core-shell particles, an Ag slurry was used, in an amount corresponding to 2.67 g of Ag core particles, and 50 mL of pure water, 33.3 mL of a solution resulting from dissolving diamminedichloropalladium (II) in 1.0% aqueous ammonia (prepared so as to contain 0.66 g of Pd), and 1.70 mL of hydrazine carbonate were used.

Example 2-3

A powder material consisting of AgPd core-shell particles of Example 2-3 was produced using the same materials and in accordance with the same process as in Example 2-1, but herein to form the AgPd core-shell particles, an Ag slurry was used, in an amount corresponding to 2.33 g of Ag core particles, and 35 mL of pure water, 50.0 mL of a solution resulting from dissolving diamminedichloropalladium (II) in 1.0% aqueous ammonia (prepared so as to contain 1.00 g of Pd), and 2.55 mL of hydrazine carbonate were used.

Example 2-4

A powder material consisting of AgPd core-shell particles of Example 2-4 was produced using the same materials and in accordance with the same process as in Example 2-1, but herein to form the AgPd core-shell particles, an Ag slurry was used, in an amount corresponding to 2.00 g of Ag core particles, and used 21 mL of pure water, 66.6 mL of a solution resulting from dissolving diamminedichloropalladium (II) in 1.0% aqueous ammonia (prepared so as to contain 1.33 g of Pd), and 3.40 mL of hydrazine carbonate were used.

Example 3-1

Preparation of Ag Core Particle Dispersion (Ag Slurry)

Herein, an Ag slurry of the present example was prepared using the same materials and in accordance with the same process as in Example 1-4 described above.

Formation of Core-Shell Particles and Production of Powder Material

Herein, 27.0 mL of pure water and 3 mL of a quinone solution were added to 0.21 g of potassium tetrachloroplatinate (II), with stirring using a magnetic stirrer. Herein, a GC measurement of the added quinone solution revealed a hydroquinone concentration of 4.53 g/L and a benzoquinone concentration of 0.06 g/L.

Next, 0.10 mL of 28% aqueous ammonia and the above prepared Ag slurry, in an amount corresponding to 0.9 g of Ag core particles, were further added, with stirring using a magnetic stirrer and with ultrasonic dispersion for 10 minutes. Then, 0.14 mL of the reducing agent hydrazine carbonate were added while under stirring of the slurry using a magnetic stirrer, and stirring was continued for 30 minutes. Herein, blackening and foaming of the slurry exhibiting Pt precipitation, derived from reduction of the Pt complex, were observed immediately after addition of the hydrazine carbonate. Otherwise, a powder material consisting of AgPt core-shell particles of Example 3-1 was then produced using the same materials and in accordance with the same process as in Example 1-1.

Example 3-2

A powder material consisting of AgPt core-shell particles of Example 3-2 was produced using the same materials and in accordance with the same process as in the Example 3-1, but herein to form the core-shell particles, an Ag slurry was used, in an amount corresponding to 0.95 g of Ag core particles, and 0.11 g of potassium tetrachloroplatinate (II), and 0.05 mL of 28% aqueous ammonia were used.

Example 3-3

Preparation of Ag Core Particle Dispersion (Ag Slurry)

Herein, an Ag slurry of the present example was prepared using the same materials and in accordance with the same process as in Example 1-4 described above.

Formation of Core-Shell Particles and Production of Powder Material

To 0.0405 g of nickel chloride (II) hexahydrate (product 141-01045: by Wako Pure Chemical Industries, Ltd.), 22.0 mL of pure water and 3 mL of a quinone solution were added, with stirring using a magnetic stirrer. The quinone solution added herein was the same as in Example 2-1. There was further added the Ag slurry (amount corresponding to 0.99 g of Ag powder), with ultrasonic dispersion for 10 minutes. Then, a solution resulting from dispersion 0.0483 g of the reducing agent sodium borohydride in 10 mL of pure water was added over 1 minute, under stirring using a magnetic stirrer, and with further stirring for 30 minutes. Discoloration and foaming of the slurry, exhibiting precipitation of nickel boride, derived from reduction of a Ni complex, were observed immediately after addition of the sodium borohydride. Otherwise, a powder material consisting of AgNi core-shell particles of Example 3-3 was then produced using the same materials and in accordance with the same process as in Example 1-1.

Comparative Example 1-1

A powder material consisting of AgPd core-shell particles of Comparative example 1-1 was produced using the same materials and in accordance with the same process as in Example 1-4, but herein using a quinone solution having a hydroquinone concentration of 17.78 g/L and a benzoquinone concentration of 0.13 g/L, with the addition amount of the quinone solution set to 6 mL.

Comparative Example 1-2

A powder material consisting of AgPd core-shell particles of Comparative example 1-2 was produced using the same materials and in accordance with the same process as in Example 1-4, but herein using a quinone solution having a hydroquinone concentration of 2.21 g/L and a benzoquinone concentration of 44.32 g/L.

Comparative Example 2-1

A powder material consisting of AgPd core-shell particles of Comparative example 2-1 was produced using the same materials and in accordance with the same process as in Example 2-1, but herein to form the core-shell particles, an Ag slurry was used in an amount corresponding to 1.80 g of Ag core particles, and 6.3 mL of pure water, 83.3 mL of a solution resulting from dissolving diamminedichloropalladium (II) in 1.0% aqueous ammonia (prepared so as to contain 1.53 g of Pd), and 4.25 mL of hydrazine carbonate were used.

Comparative Example 2-2

A powder material consisting of AgPd core-shell particles of Comparative example 2-2 was produced using the same materials and in accordance with the same process as in Example 2-1, but herein to form the core-shell particles, an Ag slurry was used in an amount corresponding to 1.33 g of Ag core particles, and 36 mL of pure water, 55.5 mL of a solution resulting from dissolving diamminedichloropalladium (II) in 1.8% aqueous ammonia (prepared so as to contain 2.00 g of Pd), and 5.10 mL of hydrazine carbonate were used.

3. EVALUATION TESTS

Various evaluation tests were performed on the above powder materials. The evaluated items and test results are shown in Table 1. An overview of the evaluation tests is set out below.

(1) Analysis of the Distribution of the Shell (Pd or Pt) by FE-SEM Observation and EDX:

Herein, a FE-SEM image of each powder material was acquired using a commercially available device SU-8230 (by Hitachi High-Technologies Corporation), and the horizontal Feret diameter of 100 or more core-shell particles was measured, to calculate the average particle size ($D_{SEM}$). This SEM diameter is the diameter closest to the value of primary particle size. The distribution state of Pd or Pt that makes up the shell was examined by SEM-EDX, using SU-8230 and X-max (by Horiba Ltd.).

(2) Calculation of Z Average Particle Size ($D_{DLS}$) and Polydispersity Index (PDI) Based on a Dynamic Light Scattering (DLS) Method, and Degree of Adhesion ($D_{DLS}/D_{SEM}$):

A sample of moderate concentration was prepared through ultrasonic dispersion with pure water as a predetermined medium (dispersion medium), and using ZetaSizer Nano ZS (by Malvern Panalytical Ltd.) which is a commercially available device, and then the sample was subjected to a DLS measurement at 20 to 25° C., and a Z average particle size ($D_{DLS}$) and a polydispersity index (PDI) were worked out on the basis of a general cumulant method. An appropriate dispersion medium and appropriate dispersion method can be selected depending on the test sample; also, additives such as dispersant and a viscosity adjusting agent can be used herein. Suitable media other than pure water include DMF, EG and IBA. Further, a particle size distribution close to the particle size distribution in an agglomeration-free dispersed state can be worked out by carrying out a DLS measurement with proper selection of the medium (dispersion medium) and additives. Further, adhered particles are measured as they are, in the adhered state.

There was further calculated a degree of adhesion, i.e. $D_{DLS}/D_{SEM}$ being the ratio of the Z average particle size ($D_{DLS}$) and the average particle size ($D_{SEM}$) based on a FE-SEM image. A degree of agglomeration derived from shell formation can be evaluated based on the degree of adhesion.

There was also calculated herein a core-shell $D_{DLS}$/core $D_{DLS}$, being the ratio between the Z average particle size (core-shell $D_{DLS}$) of the core-shell particles and the Z average particle size (core $D_{DLS}$) of the core particles. This core-shell $D_{DLS}$/core $D_{DLS}$ will be referred to as degree of adhesion Z, to be distinguished from $D_{DLS}/D_{SEM}$.

(3) Measurement of Hydroquinone (HQ) Concentration and Benzoquinone (BQ) Concentration in the Quinone Solution:

The quinone solution was measured by gas chromatography (GC). Test samples having a concentration of 10 g/L or higher were diluted as appropriate with alcohol (ethanol). The measurements conditions were as follows.
Column: DB-5 ms (by Agilent Technologies Inc.)
Injection port temperature: 280° C.
Temperature rise conditions: 50° C. (2 minutes)-10° C./minute-300° C. (10 minutes)

The detection sensitivity of hydroquinone and benzoquinone varies depending on the concentration, and accordingly the concentration of the foregoing was calculated as follows.
Concentration Lower than 1 g/L:
Standard solutions of 0.1 g/L and 1 g/L are prepared, and GC measurements are carried out. An approximate straight line passing through the origin is calculated by least squares, on the basis of these two points, with the concentration on the horizontal axis and the detected surface area on the vertical axis. The concentration is then worked out using this straight line as a calibration curve.
Concentration from 1 g/L to Lower than 10 g/L:
Standard solutions of 1 g/L, 5 g/L and 10 g/L are measured, and GC measurements are carried out. Then, an approximate straight line passing through the origin is calculated by least squares, on the basis of these three points, with concentration on the horizontal axis and the detected surface area on the vertical axis. The concentration is then worked out using this straight line as a calibration curve.

(4) Calculation of the HQ/BQ Ratio of Core-Shell Particles (Powder Material):

Ethanol was added to the powder material (dry powder) of each sample, followed by stirring and an ultrasonic treatment, to thereby extract a surface component that was then concentrated, using an evaporator, up to a concentration at which HQ and BQ were detected in a GC measurement. The GC measurement conditions are similar to the GC measurement conditions in (3) above.

TABLE 1

| Sample | Shell proportion (mass %) | HQ conc. (g/L) | BQ conc. (g/L) | HQ/BQ ratio (—) | Core-shell particles Z-Average (nm) | Core-shell particles PDI [—] | Ag core particles Z-Average (nm) | Ag core particles PDI (—) | SEM diameter (nm) | degree of adhesion Z (—) | Degree of adhesion (—) |
|---|---|---|---|---|---|---|---|---|---|---|---|
| Ex. 1-1 | 10(Pd) | 2.45 | 0.15 | 16 | 263.3 | 0.117 | 240.0 | 0.135 | 192 | 1.10 | 1.37 |
| Ex. 1-2 | 10(Pd) | 3.37 | 0.05 | 67 | 199.8 | 0.103 | ↑ | ↑ | 195. | 0.96 | 1.02 |
| Ex. 1-3 | 10(Pd) | ↑ | ↑ | ↑ | 1311 | 0.205 | 1404 | 0.251 | 957 | 0.93 | 1.37 |
| Ex. 1-4 | 10(Pd) | 29.95 | 0.26 | 115 | 393.3 | 0.149 | 359.7 | 0.136 | 317 | 1.09 | 1.24 |
| Ex. 1-5 | 10(Pd) | 5.03 | 13.84 | 0.4 | 394 | 0.129 | ↑ | ↑ | 319 | 1.10 | 1.24 |
| Ex. 2-1 | 10(Pd) | 3.08 | 2.16 | 1.4 | 171.4 | 0.125 | 171.0 | 0.106 | 146 | 1.00 | 1.17 |
| Ex. 2-2 | 20(Pd) | ↑ | ↑ | ↑ | 184.5 | 0.133 | ↑ | ↑ | 158 | 1.08 | 1.17 |
| Ex 2-3 | 30(Pd) | ↑ | ↑ | ↑ | 233.4 | 0.219 | ↑ | ↑ | 145 | 1.36 | 1.61 |
| Ex. 2-4 | 40(Pd) | ↑ | ↑ | ↑ | 224.7 | 0.186 | ↑ | ↑ | 164 | 1.31 | 1.37 |
| Ex. 3-1 | 10(Pt) | 4.91 | 0.06 | 82 | 354.9 | 0.117 | 359.7 | 0.136 | 303 | 0.99 | 1.17 |
| Ex. 3-2 | 5(Pt) | ↑ | ↑ | ↑ | 348.6 | 0.135 | ↑ | ↑ | 327 | 0.97 | 107 |
| Ex. 3-3 | 1(Ni) | 3.08 | 2.16 | 1.4 | 515.1 | 0.217 | 359.7 | 0.136 | 331 | 1.43 | 1.56 |
| Comp. ex. 1-1 | 10(Pd) | 17.71 | 0.13 | 136 | Fast settling Difficult to measure | | ↑ | ↑ | 330 | Not measurable | Not measurable |
| Comp. ex. 1-2 | 10(Pd) | 3.48 | 43.08 | 0.08 | 1149 | 0.35 | ↑ | ↑ | 344 | 3.19 | 3.34 |
| Comp. ex. 2-1 | 50(Pd) | 3.08 | 2.16 | 1 | 764.8 | 0.533 | 171.0 | 0.106 | 177 | 4.47 | 4.32 |
| Comp. ex. 2-2 | 60(Pd) | ↑ | ↑ | ↑ | Fast settling Difficult to measure | | ↑ | ↑ | Primary particles indistinguishable | Not measurable | Not measurable |

Ex.: Example
Comp. ex: Comparative example
conc.: concentration

As shown in Table 1, significantly fast settling did not occur in any of the powder materials of the examples, and the DLS measurement could be performed normally. The values of the degree of adhesion ($D_{DLS}/D_{SEM}$) and the degree of adhesion Z (core-shell $D_{DLS}$/core $D_{DLS}$) were both about 1, i.e. no significant adhesion was observed. It is deemed that the value lower than 1 for the degree of adhesion Z (core-shell $D_{DLS}$/core $D_{DLS}$) derives from the fact that the dispersibility in water of the powder consisting of core-shell particles was made higher than that of the powder consisting of core particles. The values of the degree of adhesion and the degree of adhesion Z exhibited virtually no change, and both represent well the degree of adhesion.

Meanwhile, settling derived from adhesion and/or agglomeration was observed in Comparative example 1-1, where the HQ/BQ ratio was excessively high, Comparative example 1-2, where the HQ/BQ ratio was excessively low, and Comparative examples 1-2 and 2-2, where the ratio the Pd shell was 50 mass % or higher. An increase in Z average particle size ($D_{DLS}$) based on the DLS method was likewise observed. In Comparative example 2-2 the Pd concentration was high and adhesion significant, and thus primary particle size could not be measured by FE-SEM.

Figure 1:
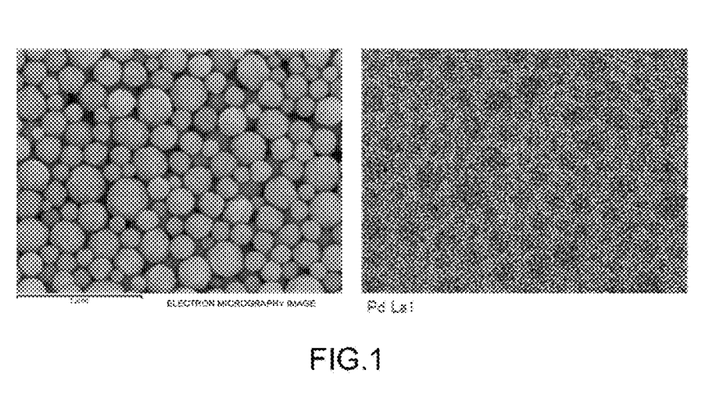
FIG. 1 is a set of an FE-SEM image and an EDX element mapping image of a powder material of Example 1-1, depicting the FE-SEM image on the left and a Pd element mapping image on the right.
Figure 2:
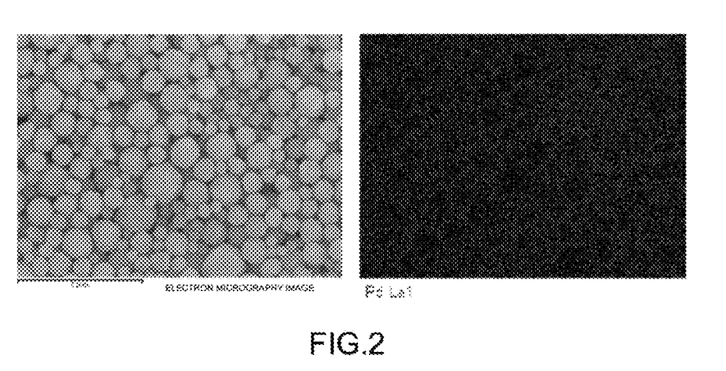
FIG. 2 is a set of an FE-SEM image and an EDX element mapping image of a powder material of Example 1-2, depicting the FE-SEM image on the left and a Pd element mapping image on the right.
Figure 3:
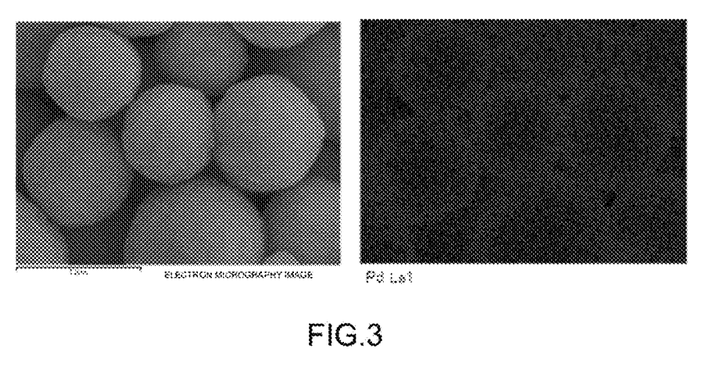
FIG. 3 is a set of an FE-SEM image and an EDX element mapping image of a powder material of Example 1-3, depicting the FE-SEM image on the left and a Pd element mapping image on the right.
Figure 4:
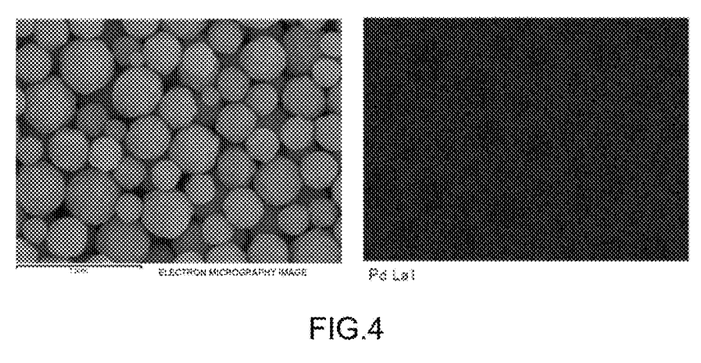
FIG. 4 is a set of an FE-SEM image and an EDX element mapping image of a powder material of Example 1-4, depicting the FE-SEM image on the left and a Pd element mapping image on the right.
Figure 5:
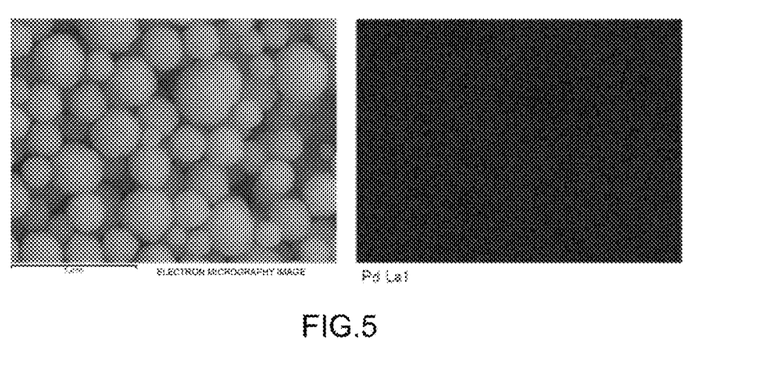
FIG. 5 is a set of an FE-SEM image and an EDX element mapping image of a powder material of Example 1-5, depicting the FE-SEM image on the left and a Pd element mapping image on the right.
Figure 6:
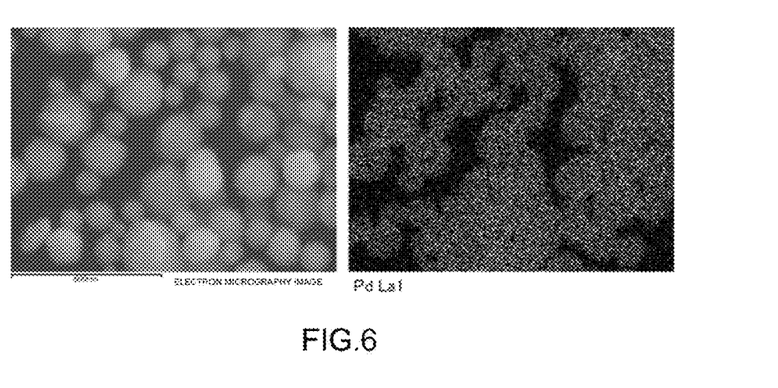
FIG. 6 is a set of an FE-SEM image and an EDX element mapping image of a powder material of Example 2-1, depicting the FE-SEM image on the left and a Pd element mapping image on the right.
Figure 7:
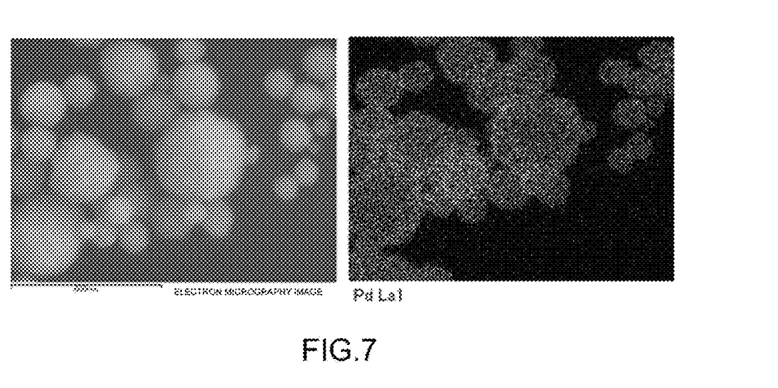
FIG. 7 is a set of an FE-SEM image and an EDX element mapping image of a powder material of Example 2-2, depicting the FE-SEM image on the left and a Pd element mapping image on the right.
Figure 8:
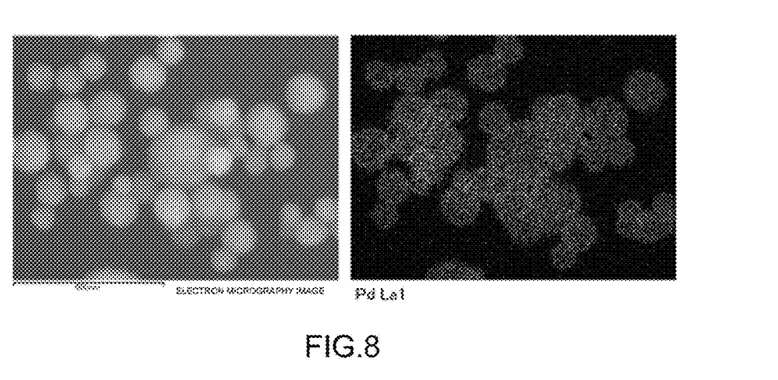
FIG. 8 is a set of an FE-SEM image and an EDX element mapping image of a powder material of Example 2-3, depicting the FE-SEM image on the left and a Pd element mapping image on the right.
Figure 9:
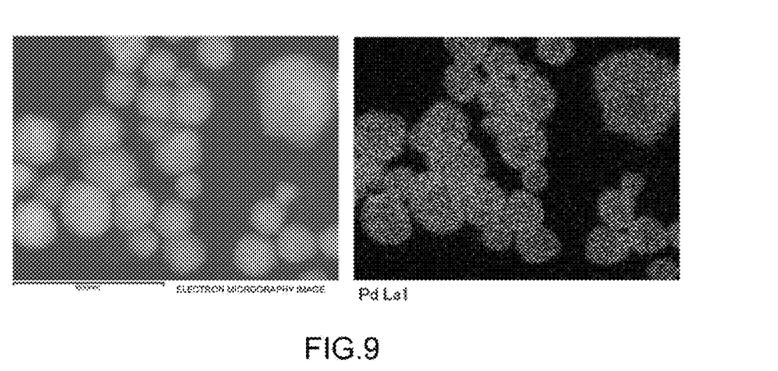
FIG. 9 is a set of an FE-SEM image and an EDX element mapping image of a powder material of Example 2-4, depicting the FE-SEM image on the left and a Pd element mapping image on the right.
Figure 10:
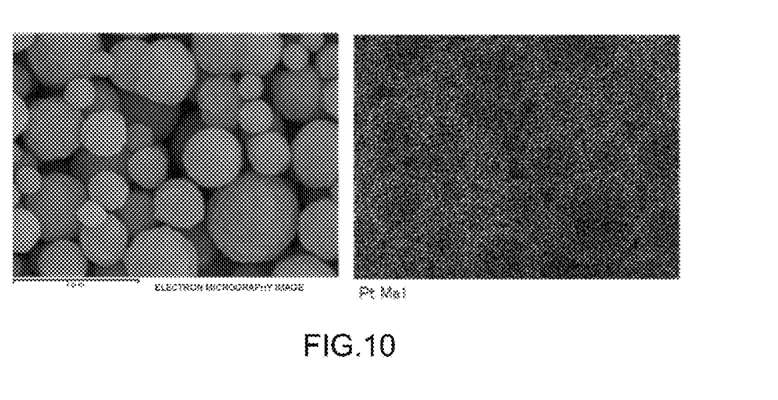
FIG. 10 is a set of an FE-SEM image and an EDX element mapping image of a powder material of Example 3-1, depicting the FE-SEM image on the left and a Pt element mapping image on the right.
Figure 11:
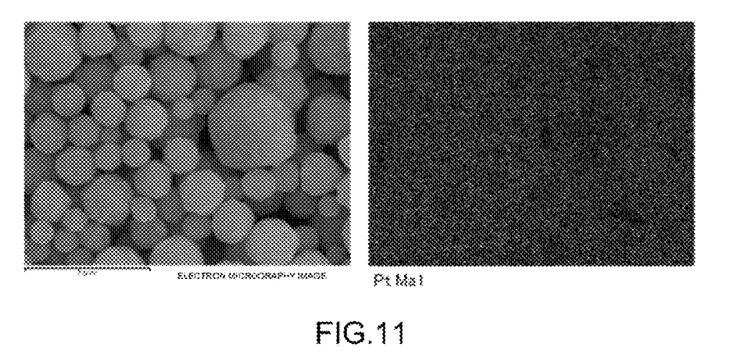
FIG. 11 is a set of an FE-SEM image and an EDX element mapping image of a powder material of Example 3-2, depicting the FE-SEM image on the left and a Pt element mapping image on the right.
Figure 12:
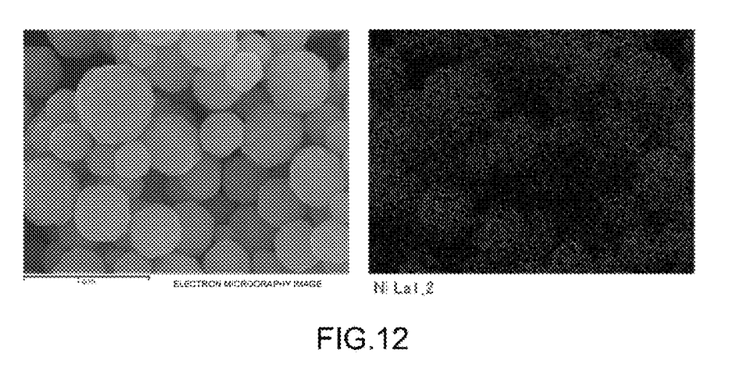
FIG. 12 is a set of an FE-SEM image and an EDX element mapping image of a powder material of Example 3-3, depicting the FE-SEM image on the left and a Ni element mapping image on the right.

FIG. 1 to FIG. 12 each illustrates a FE-SEM image (left) and an EDX element mapping image (right) of a respective example. As the figures show, a shell formed substantially uniformly on the core particles in all instances, Particles on which no shell precipitated, and single particles of shell metal alone, were not seen in the observation field.

As the results of the examples reveal, core-shell particles (powder material) in which adhesion at the time of shell metal precipitation is suppressed can be produced easily through the use of a quinone solution having a HQ/BQ ratio lying in a specific range. It is deemed that a metal that forms a complex with hydroquinone and/or benzoquinone is preferred in terms of suppressing interparticle adhesion. In particular, elements of groups 8, 9 and 10 of the periodic table, and more preferably the platinum group among these, form complexes readily. Further, it is deemed that the action of hydroquinone and benzoquinone on the shell metal weakens influence of the cores, and thus the cores can be covered with various metals so long as these metals disperse well in the dispersion medium. This is thought to relate to coordination of hydroquinone and benzoquinone with the shell metal. Although both hydroquinone and benzoquinone can coordinate with platinum group elements such as palladium and platinum, formation of a complex of benzoquinone alone with the shell metal results in excessively stable complexes, and makes precipitation difficult to control. Also in a case by contrast where both hydroquinone and benzoquinone are present, the complex is not stabilized when the ratio of benzoquinone is too low, which may result in a higher reaction rate and the occurrence of adhesion. Accordingly, adhesion/agglomeration at the time of shell formation can be suppressed if a balance is struck between hydroquinone and benzoquinone. Further, adhesion after shell formation can be prevented thanks to the presence of residual hydroquinone and benzoquinone on the shell surface.

Concrete examples of the present invention have been explained in detail on the basis of test examples, but these are merely illustrative and are not meant to limit the claims in any way. The features set forth in the claims encompass various modifications and changes to the concrete examples illustrated above. In the examples above, for instance, the metal that makes up the shell is palladium, platinum or nickel, but the metal is not limited thereto, and may be some other metal (for instance a metal belonging to the platinum group other than Pd and Pt). The art disclosed herein can be used also in cores other than metals, for instance cores consisting of inorganic compounds other than metals, for instance ceramics.

The invention claimed is:

1. A method for manufacturing core-shell particles comprising core particles and a shell covering at least part of the core particles, main constituent metal elements of the core particles and the shell being different from each other, the method comprising:
   a step of preparing a quinone-containing core particle dispersion containing at least core particles consisting of a first metal, hydroquinone (HQ), benzoquinone (BQ), and a second metal compound including a second metal element for making up the shell; and
   a step of forming the shell including the second metal element as a main constituent element on the surface of the core particles by adding a reducing agent to perform a reduction treatment on the quinone-containing core particle dispersion,
   wherein a mass ratio: HQ/BQ ratio of the hydroquinone (HQ) added in the step of preparing the quinone-containing core particle dispersion and the benzoquinone (BQ) added in the step of preparing the quinone-containing core particle dispersion is 0.1 to 120.

2. The manufacturing method according to claim 1, wherein the core particles are made up of silver (Ag) as a main constituent metal element, and the shell is made up of ruthenium (Ru), rhodium (Rh), palladium (Pd), osmium (Os), iridium (Ir), platinum (Pt), or nickel (Ni) as a main constituent metal element.

* * * * *